US011457022B1

(12) United States Patent
Neel (10) Patent No.: US 11,457,022 B1
(45) Date of Patent: Sep. 27, 2022

(54) SYSTEMS AND METHODS FOR DETECTING MALWARE DOMAIN NAMES

(71) Applicant: UIPCO, LLC, San Antonio, TX (US)

(72) Inventor: Robert Neel, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 410 days.

(21) Appl. No.: 16/143,053

(22) Filed: Sep. 26, 2018

Related U.S. Application Data

(60) Provisional application No. 62/563,530, filed on Sep. 26, 2017.

(51) Int. Cl.
*H04L 29/06* (2006.01)
*H04L 9/40* (2022.01)
*G06F 16/245* (2019.01)
*G06F 16/23* (2019.01)

(52) U.S. Cl.
CPC ...... *H04L 63/1416* (2013.01); *G06F 16/2379* (2019.01); *G06F 16/245* (2019.01)

(58) Field of Classification Search
CPC ......... H04L 29/06; H04L 43/16; H04L 51/12; H04L 63/10; H04L 63/14; H04L 63/20; H04L 63/101; H04L 67/42; G06F 16/23
See application file for complete search history.

(56) References Cited

U.S. PATENT DOCUMENTS

| | | | | |
|---|---|---|---|---|
| 7,849,502 B1* | 12/2010 | Bloch | ............... | H04L 63/168 726/11 |
| 2010/0174829 A1* | 7/2010 | Drako | ............... | H04L 61/4511 709/245 |
| 2010/0325250 A1* | 12/2010 | Colosi | ............... | H04L 29/12066 709/221 |
| 2014/0096251 A1* | 4/2014 | Doctor | ............... | G06F 21/55 726/23 |
| 2016/0065534 A1* | 3/2016 | Liu | ............... | H04L 61/1511 707/728 |
| 2018/0052936 A1* | 2/2018 | Cora | ............... | G06N 20/20 |
| 2018/0295086 A1* | 10/2018 | Pawar | ............... | H04L 51/28 |
| 2019/0222589 A1* | 7/2019 | Kislitsin | ............... | H04L 63/0236 |

OTHER PUBLICATIONS

Oprea et al., "Detection of Early-Stage Enterprise Infection by Mining Large-Scale Log Data", 2015 45th Annual IEEE/IFIP International Conference on Dependable Systems and Networks, Date of Conference: Jun. 22-25 (Year: 2015).*

* cited by examiner

*Primary Examiner* — Morshed Mehedi
(74) *Attorney, Agent, or Firm* — Perkins Coie LLP (57) ABSTRACT

Disclosed herein are systems and methods of executing scanning software, such an executable software program or script (e.g., PowerShell script), by a computing device of an enterprise, such as a security server, may instruct the computing device to search all or a subset of computing devices in an enterprise network. The scanning software my identify PowerShell scripts containing particular malware attributes, according to a malicious-code dataset. The computing system executing the scanning software may scan through the identified PowerShell scripts to identify particular strings, values, or code-portions, and take a remedial action according to the scanning software programming.

20 Claims, 3 Drawing Sheets

SYSTEMS AND METHODS FOR DETECTING MALWARE DOMAIN NAMES

CROSS REFERENCES TO RELATED APPLICATIONS

This application claims priority to U.S. Provisional Application Ser. No. 62/563,530, filed Sep. 26, 2017, which is hereby incorporated by reference in its entirety.

TECHNICAL FIELD

This application relates generally to enterprise networking and domain name management.

BACKGROUND

Undesirable software, such as computer viruses and spyware, generally known as "malware," affect many computers and enterprise networks. Malware applications are often associated with potentially malicious domain names hosted on servers belonging to bad actors. The malware will often contact, or "call home," to these servers, which then introduce viruses, steal account information, or perform other malicious actions. Some malware designers use randomly generated domain names to identify the host servers that manage, instruct, or control the malware. These domain names, based on the fact that they are randomly generated, may have parts that are not be based on any dictionary word. For example, domain name "dbcibwqijdb.org" may represent a potential malware domain name, since the domain name has such an anomalous sequence of alphanumeric characters, and is an unlikely destination for an innocent web surfer. Many malware distribution sites may use such fabricated domain names to spread, manage, and control malware applications to unsuspecting users.

Conventional computer security techniques for detecting potential malware domain names may have limited effectiveness, can be time-consuming, and are often resource-intensive. For example, conventional computer security techniques would take each domain name, one at a time, and loop through every dictionary word looking for matches between dictionary words and the words parsed from the domain name. The problem with this approach is that the dictionary words are on average 5.1 letters long, but domain names are typically 10 characters long (based on top 1 million websites) (http://www.gaebler.com/Domain-Length-Research.htm). As result, there are $3.06 \times 10^{13}$ operations needed to perform that matching query, which, on a quad-core 2.8 GHz server, takes between 24 to 36 hours to complete. Thus, such conventional techniques for detecting potential malware domain names are very time-consuming.

As an improvement upon this technique, if a security company is able to determine how a particular piece of malware is generated, the security company could potentially take remedial actions with respect to those domains by using domain generation algorithms where the security vendors would have to reverse engineer the malware program, for example, executable code to derive the exact algorithm being used for generating domain names such that they can be blocked. Typically, malware designers complicate their domain generation algorithms, and do so at a level of sophistication that makes reverse engineering the malware and domain generation algorithms in a timely manner difficult. For instance, a researcher may need to expend months of effort to reverse engineer a single domain generation algorithm. In contrast, malware designers can modify the workings of their domain generation algorithms with relative ease/speed, and therefore by the time the researcher has discovered how the domain generation algorithms works, the malware designer can easily have switched to a new algorithm, and again taking potentially months to discover how the new algorithm works. Consequently, the reverse engineering of malware programs is resource-intensive and time-intensive such that precious time may be lost before the domain generation algorithm can be cracked to detect such domain name queries.

The reverse engineering effort applied to the domain generation algorithm is also not scalable for similar future attacks because the samples of existing computer viruses or other malware are required in order to detect future infections. Therefore, for new malware, i.e., malware that affects computers for the first time and has not been seen or analyzed before, it can be more difficult to prevent and detect such malware. In addition, in a domain name service (DNS) process where one domain name is mapped to a changing set of IP-addresses, such combination would be even more difficult to detect.

SUMMARY

What is therefore needed is a technique for monitoring and recognizing problematic domain names by determining whether domain names within uniform resource links (URLs) are associated with incidents of malicious behavior without the need to download and reverse engineer malicious code. A system server may execute a scanning software, such an executable software program that may instruct the system server to search all or a subset of domain names in an enterprise network. The scanning software may then identify the domain names containing particular malware attributes, according to a malicious-code dataset. The system server executing the scanning software may scan through the identified domain names to identify particular strings, values, or code-portions, and take a remedial action according to the scanning software programming.

In one embodiment, a server-implemented method comprising receiving, by a server, a request from a computing device of a user to access a first website associated with a first domain name; upon determining, by the server, that the first domain name is in a blacklist record of a case management database comprising a set of one or more blocked domain names, preventing, by the server, access to the first domain name; receiving, by the server, a plurality of log files from a plurality of data sources configured to generate and store the plurality of the log files, wherein each of the plurality of log files contains a domain name field associated with one of a plurality of domain names, the plurality of domain names comprising the first domain name; parsing, by the server, the domain name field from each respective log file; identifying, by the server, one or more unique domain names in a plurality of domain name fields parsed from the plurality of log files; querying, by the server, a whitelist record and the blacklist record stored in the case management database to determine if there is a record of any of the one or more unique domain names, the whitelist record comprising a set of one or more acceptable domain names; upon determining that the first domain name in the one or more unique domain names is in the blacklist record, automatically foregoing, by the server, further processing associated with the first domain name; executing, by the server, a protocol to determine a credibility score for each of remaining one or more unique domain names based at least upon a length of the each of the remaining one or more unique domain names and a comparison of each of the remaining one or more unique domain names with a domain name corpus stored in a dictionary database, the domain name corpus comprising a plurality of words; upon determining that the credibility score for a second domain name in the one or more remaining unique domain names fails an acceptability threshold, updating, by the server, the blacklist record to include the second domain name; receiving, by the server, a new request from the computing device of the user to access a second website associated with the second domain name; and upon determining that the second domain name is in an updated blacklist record, preventing, by the server, access to the second domain name.

In another embodiment, a system may include a computing device of a user; a dictionary database comprising a domain name corpus, the domain name corpus comprising a plurality of words; a case management database storing a blacklist record comprising a set of one or more blocked domain names and a whitelist record comprising a set of one or more acceptable domain names; and a server. The server is configured to receive a request from the computing device of the user to access a first website associated with a first domain name; upon determining that the first domain name is in the blacklist record, prevent access to the first domain name; receive a plurality of log files from a plurality of data sources configured to generate and store the plurality of the log files, wherein each of the plurality of log files contains a domain name field associated with one of a plurality of domain names, the plurality of domain names comprising the first domain name; parse the domain name field from each respective log file; identify one or more unique domain names in a plurality of domain name fields parsed from the plurality of log files; query the whitelist record and the blacklist record to determine if there is a record of any of the one or more unique domain names; upon determining that the first domain name in the one or more unique domain names is in the blacklist record, automatically forego further processing associated with the first domain name; execute a protocol to determine a credibility score for each of remaining one or more unique domain names based at least upon a length of the each of the remaining one or more unique domain names and a comparison of each of the remaining one or more unique domain names with the domain name corpus; upon determining that the credibility score for a second domain name in the one or more remaining unique domain names fails an acceptability threshold, update the blacklist record to include the second domain name; receive a new request from the computing device of the user to access a second website associated with the second domain name; and upon determining that the second domain name is in an updated blacklist record, prevent access to the second domain name.

In another embodiment, a computer-implemented method includes receiving, by a computer, a plurality of log files from a plurality of data sources configured to generate and store the plurality of the log files, wherein each respective log file contains a domain name field. The computer-implemented method further includes parsing, by the computer, the domain name field from each respective log file. The computer-implemented method further includes identifying, by the computer, one or more unique domain names in the domain name fields parsed from the plurality of log files. The computer-implemented method further includes determining, by the computer, a credibility score for each respective unique domain name based upon a comparison with a domain name corpus stored in a dictionary database, the domain name corpus comprising a plurality of words. The computer-implemented method further includes upon determining that the credibility score for a unique domain name in the one or more unique domain names fails an acceptability threshold, updating, by the computer, a case management database configured to store a plurality of security records, and transmitting, by the computer, an alert to one or more administrator devices, the alert identifying the unique domain name.

In another embodiment, a system includes a plurality of data sources, a case management database, and a computer. The computer is configured to receive a plurality of log files from the plurality of data sources configured to generate and store the plurality of the log files, wherein each respective log file contains a domain name field. The computer is further configured to parse the domain name field from each respective log file. The computer is further configured to identify one or more unique domain names in the domain name fields parsed from the plurality of log files. The computer is further configured to determine a credibility score for each respective unique domain name based upon a comparison with a domain name corpus stored in a dictionary database, the domain name corpus comprising a plurality of words. The computer is further configured to, upon determining that the credibility score for a unique domain name in the one or more unique domain names fails an acceptability threshold: update the case management database configured to store a plurality of security records and transmit an alert to one or more administrator devices, the alert identifying the unique domain name.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate an embodiment of the subject matter and together with the specification, explain the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1:
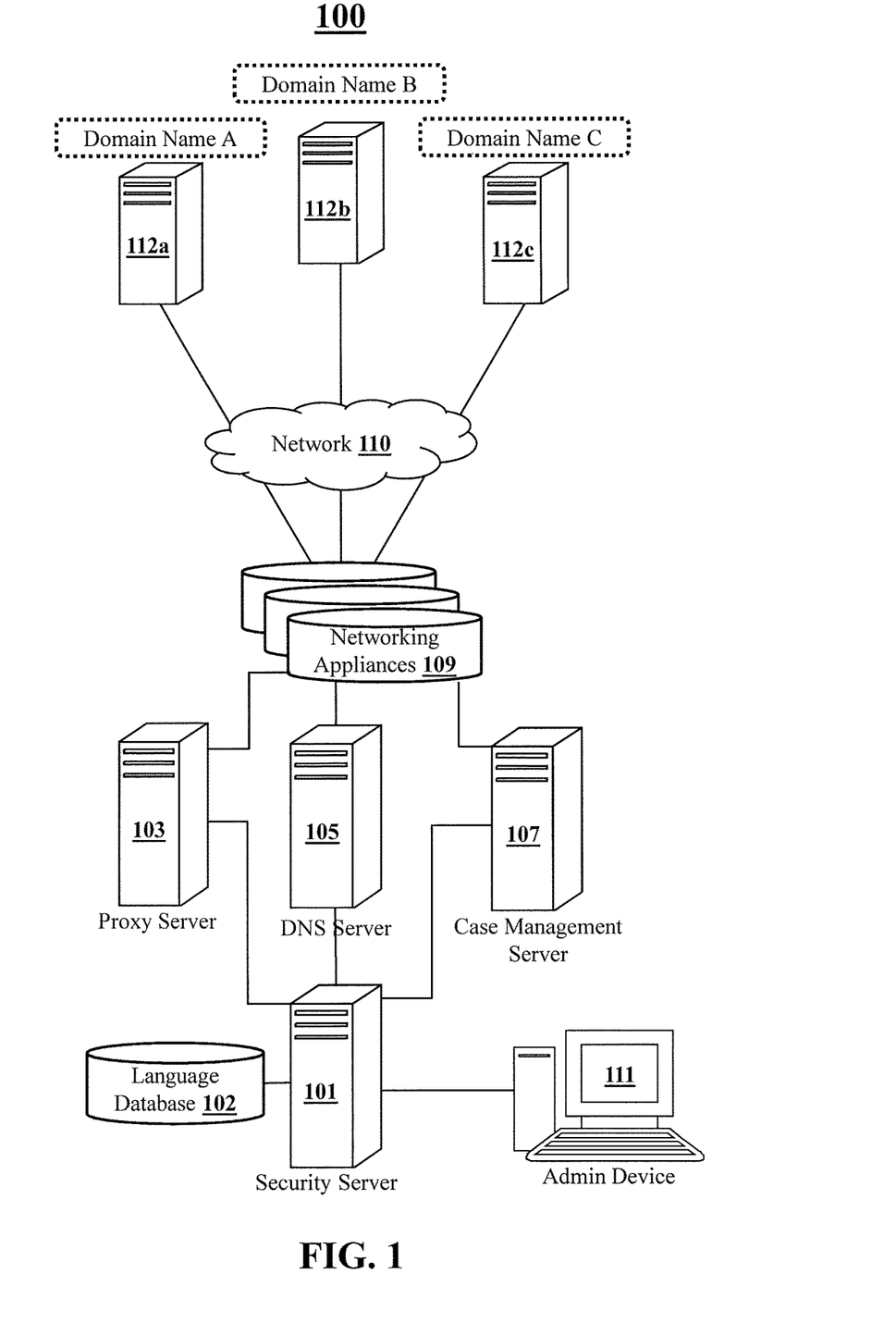
FIG. 1 shows components of a system for identifying and tracking malicious, harmful, or otherwise unscrupulous domain names, according to an embodiment.

FIG. 1 shows components of a system 100 for identifying and tracking malicious, harmful, or otherwise unscrupulous domain names. The system 100 includes a security server 101, a database 102, log-generating devices 103, 105, 107, 109, and one or more administrator devices 111, each of which may be located physically and/or logically within an enterprise system boundary. In the system 100 the log-generating devices 103, 105, 107, 109 may include a proxy server 103, a domain name server (DNS server 105), a case management server 107, and networking appliances 109. But other embodiments may not include certain servers, such as a proxy server 103; or, in some embodiments, the networking appliances 109 may not be configured to generate logs containing domain name fields that would be useful in the various features and functions described herein.

The system 100 further includes external servers 112 (such as 112a, 112b, and 112c) that host domains external to the enterprise system boundary, and that are connected to the various devices within the enterprise boundary through a communication network 110. The examples of the network 110 include, but are not limited to, private or public LAN, WLAN, MAN, WAN, and the Internet. The network 110 can include both wired and wireless communications according to one or more standards and/or via one or more transport mediums. The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets, or another standard or proprietary wireless communication protocol. The network 110 may also include communications over a cellular network, including, e.g. a GSM (Global System for Mobile Communications), CDMA (Code Division Multiple Access), EDGE (Enhanced Data for Global Evolution) network.

A security server 101 may receive and analyze network traffic logs containing domain names to identify potentially malicious or otherwise problematic domains that have contacted devices or user accounts in an enterprise system. In the embodiment, the security server 101 may receive log files from a number of devices that manage or monitor network traffic through the enterprise, such as a proxy server 103, a domain name server (DNS server 105), a case management server 107, and networking appliances 109. Log files may be any file format or file type with a domain field containing domain name values for inbound or outbound network traffic. At a predetermined interval or in response to a triggering event, the security server 101 may receive or request the log files from one or more of the log-generating devices 103, 105, 107, 109, and then parse the domain names from the log files. The security server 101 may then identify the unique domain names from the parsed domain names, and execute processes to determine whether the unique domain names are likely to be malicious or otherwise problematic. The security server 101 may then update a case management database (not shown), which may be hosted by a case management server 107, with characteristic information about suspect domain names that fail a credibility threshold. The information may be data parsed from a log file associated with each suspect domain; non-limiting examples of such information may include the domain name, source IP address, source MAC address, and host entity information. In some implementations, the security server 101 or the case management server 107 may be configured to automatically execute a "WHOIS" protocol query against a public domain name Internet registry to gather additional public record information that may be available.

The security server 101 is a computing device including a processor capable of performing the various tasks and processes described herein. Non-limiting examples of the security server 101 may include a server, desktop, laptop, tablet, and the like. The security server 101 comprises any number of computer-networking components (e.g., network interface card) that facilitate inter-device communications via one or more internal networks (not shown), and, in some cases, the network (such as Internet) 110. There may be any number of distinct computing devices operating in a distributed computing environment as the security server 101.

As previously mentioned, log-generating devices 103, 105, 107, 109 may be any networked computing device or appliance configured to route, manage, or monitor network traffic for the enterprise boundary. In the exemplary system 100, the log-generating devices 103, 105, 107, 109 may include a proxy server 103, a domain name server (DNS server 105), a case management server 107, and networking appliances 109.

A proxy server 103 is a computing device configured to manage network communications between enterprise computing devices, such as client computer workstations, and external resources accessible via the network 110, such as websites or web-based applications hosted on the external servers 112. In an embodiment, the proxy server 103 provides a proxy gateway in effect when the communications inside or outside of the system 100 are prohibited. The proxy server 103 may receive web-service queries from plural client computers and operates to transfer the received web-service queries to the external servers 112 for providing a target service the client computer would like to reach.

The proxy server 103 may receive a web-service query from a client computer. The proxy server 103 uses the IP address that corresponds to the physical address of the client computer for the communications with the client computer. The proxy server 103 may have a function of relaying a client's access to a resource or the data of a website, for example. The client computer communicates with only the proxy server 103 without direct communications with the external servers 112.

The proxy server 103 may review and filter data traffic with web-based resources, provide anonymity to client computers, and log data traffic (e.g., inbound and outbound web-service requests). In operation, the proxy server 103 may generate log files for the interactions between devices within the enterprise boundary and external servers 112. These log files may be any file format or file type containing data records corresponding to the incoming and outgoing data communications. The data records within the log files may comprise any number of data fields containing information captured at one or more layers of the OSI model, where the information is associated with the source or destination of the data populated within a particular data record. As an example, the proxy server 103 may receive and forward a request for a webpage hosted on a particular external server 112a, where the request originated from a client computer of the enterprise. In this example, the proxy server 103 may generate a data record in a log file containing the source domain name (e.g., DomainA.com), and the source IP address (e.g., the IP address of the client computer or an enterprise IP address). As another example, the proxy server 103 may receive and forward a response from an external server 112*a*.

In operation, the security server 101 may be configured to automatically query the log files periodically or in response to a particular trigger to the proxy server 103. When querying the logs from the proxy server 103 storing logs, the security server 101 may request all log files from the proxy server 103. Upon receiving a request from the security server 101, the proxy server 103 may transmit the log files to the security server 101. The log files are then transmitted from the proxy server 103 to the security server 101 via the network 110.

A DNS server 105 is a computing device configured to manage domain names. The DNS server 105 may be further designated to store DNS database records (names and addresses), while clients of the DNS include computing devices and other devices of end users. The DNS server 105 runs special-purpose networking software, features a public IP address, and contains a database of network names and addresses for other Internet hosts.

The DNS server 105 may manage correspondence between a domain name and an IP address, which corresponds to a network address in the Internet 110. In some embodiments, a plurality of DNS servers may be provided where the DNS servers also interface with each other, acting as clients to each other when needed. The DNS server 105 may also operate to swap information with another DNS server (not shown) if necessary. The swapping operation results in making it possible to correspond all the domain names to the IP addresses included in the internet 110.

The DNS server 105 may also include computer processor(s), storage media, one or more I/O devices, system memory, and a network interface. The computer processor may be any processor capable of performing the functions described herein. The I/O devices may represent a variety of input and output devices, including keyboards, mice, visual displays, printers and so on. The network interface may allow the DNS server 105 to communicate over the network 110, and may be capable of both sending and receiving network messages. Furthermore, any computer system capable of performing the functions described herein may be used. The memory of the DNS server 105 may include one or more memory devices having blocks of memory associated with physical addresses, such as random access memory (RAM), read only memory (ROM), flash memory or other types of volatile and/or non-volatile memory. The memory of the DNS server 105 also contains a DNS database. The DNS database may contain DNS records that contain a domain name and a current IP address associated with the domain name.

In operation, the DNS server 105 may receive DNS queries for various domains, search the DNS database for the domains, and respond with IP addresses associated with the domains. The DNS server 105 may also contain a DNS query log, which the DNS server 105 may use for logging received DNS queries. For example, the DNS server 105 may receive a DNS query that specifies domain name "answers.com". Upon receiving the DNS query, the DNS server 105 may lookup "asnwers.com" in the DNS database to determine the current IP address associated with the specified domain name is "10.1.0.1010". Once the DNS server 105 has queried the DNS database, the DNS server 105 may return the current IP address of "10.1.0.1010" to the requestor, such as, the security server 101. The DNS server 105 may then log the receipt of the DNS query in the DNS query log.

During operation, the security server 101 may be configured to automatically query the log files periodically or in response to a particular trigger to the DNS server 105. When querying the logs from the DNS server 105 storing logs, the security server 101 may request all log files from the DNS server 105. Upon receiving a request from the security server 101, the DNS server 105 may transmit the log files to the security server 101. The log files are then transmitted from the DNS server 105 to the security server 101 via the network 110.

A case management server 107 is a computing device configured to host a case management database, which may include a whitelist record and a blacklist record. The case management database further stores a plurality of security records. The plurality of security records may include characteristic information about suspect domain names that fail a credibility threshold. In some embodiments, the security server 101 upon determining that the credibility score for the unique domain name fails an acceptability threshold, the security server 101 may update the case management database with the details of the unique domain names that failed the acceptability threshold. After updating the case management database, the security server 101 may transmit an alert to one or more administrator devices 111 identifying the unique domain names that failed the acceptability threshold.

A networking appliance 109 is a computing device capable of generating and/or storing network logs, sometimes referred to as "log files." The logs may be stored in any machine-readable format (e.g., TXT, XML, HTML, Access Log, Common Log, W3C Log, WAS Log), and may comprise various data fields containing data at various OSI layers from inbound IP packets (e.g., source IP address, source Domain Name, source MAC address, source device identifier). In some implementations, the logs may be stored locally in the particular network appliance or device that generated the logs, such as proxy servers, routers, firewalls, and security software applications configured to manage and track enterprise security risks. In some implementations, the logs may be stored into an enterprise security database that is accessible to the security server locally (on the same device) or via a network 110.

Figure 2:
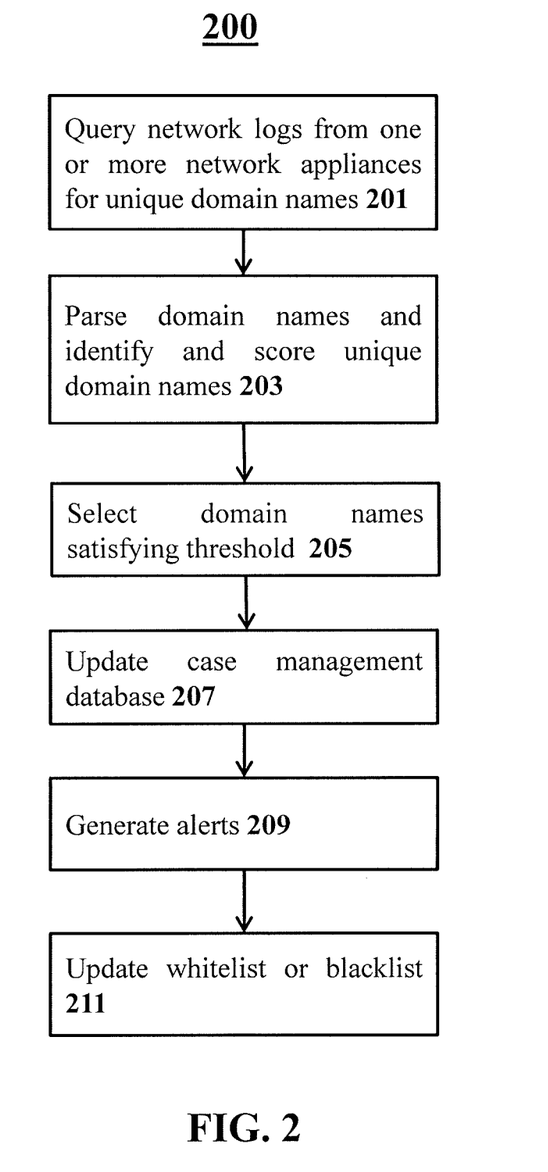
FIG. 2 shows execution of a method for identifying and tracking malicious, harmful, or otherwise unscrupulous domain names, according to an embodiment.

FIG. 2 shows execution of an automated method 200 for identifying and tracking malicious, harmful, or otherwise unscrupulous domain names. The method 200 shown in FIG. 2 includes execution steps 201, 203, 205, 207, and 209. However, other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer, referred to as a security server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 201, a security server queries network logs from one or more network appliances for unique domain names. Network appliances may be a computing device capable of generating and/or storing network logs, sometimes referred to as "log files." The logs may be stored in any machine-readable format (e.g., TXT, XML, HTML, Access Log, Common Log, W3C Log, WAS Log), and may comprise various data fields containing data at various OSI layers from inbound IP packets (e.g., source IP address, source Domain Name, source MAC address, source device identifier). In some implementations, the logs may be stored locally in the particular network appliance or device that generated the logs, such as proxy servers, routers, firewalls, and security software applications configured to manage and track enterprise security risks. In some implementations, the logs may be stored into an enterprise security database that is accessible to the security server locally (on the same device) or via a network.

In operation, a security server may automatically query the log files periodically or in response to a particular trigger. When querying the logs, the security server may request all log files from each device storing logs, which are then transmitted via the network to the security server. Additionally or alternatively, the security server may request a subset of the logs from the log-storing devices. For example, the security server may query individual portions of the network on an hourly basis. As such, the security server is only querying processing portions of the log files. In this way, the security server is not over-burdened with reviewing the logs from many log-storing devices, the log-storing devices are not over-burdened with executing a tangential side-process, and the network is not over-burdened with handling traffic to the security server from many log-storing devices. This is beneficial where there are remote network sites, and where there are many log-storing devices. Moreover, the security server may also request logs from only a subset of the log-storing devices. As an example, the security server may be configured to query and process network logs nightly. As such, the security server may request that log-storing devices transmit only the logs generated in the last twenty-four hours. In this way, the security server is not over-burdened daily with querying and processing every log from every log-storing device.

In a next step 203, a security server may parse the domain name field from the data fields of respective log files. Suitable parsing techniques are known in the art and include regular expression matching. The security server may then identify one or more unique domain names in the domain name fields parsed from the plurality of log files where the one or more unique domain names includes non-identical domain names. For instance, during execution, the security server may query the data fields of the log files containing a source domain name, to identify logs containing duplicative domain names. The security server may discard or otherwise disregard log files containing domain names that are duplicative, thereby generating a set of log records containing unique domain names.

In one example, the log files may include millions of log files where many files (such as google.com) may be repeated several times. The security server parses the domain name field from the data fields of each of the log files, and once the identical domain names are identified by the security server, the security server take action to ensure that the log files data can be leveraged to improve overall system performance, for example by matching and returning data for the one or more unique domains, that is, the non-identical domain names. In another example, the security server may match the non-identical yet equivalent domain names. The non-identical yet equivalent domain names may include at least a portion of domain name identical to one another. For instance, if a log file includes an entry of "answers.12345.com", "answers.45678.com", and "answers.com" the security server based on an indication from that the first seven characters followed by a dot comprise an identical pattern, the security server may consider the domains names to be identical and return data for the unique domain, that is, the answers.com.

In yet another example, each of the log files may have an associated URL. The security server may parse the one or more URLs for one or more domain names of the log files, such that each of the one or more URLs is associated with a particular domain name. The security server accesses a list of domain names satisfying a ranking condition based on Internet traffic data, and compares the one or more domain names of the log files with the list of the domain names. The example networks and lists include the "top websites" ranking provided by Alexa Internet, Inc. and the Google Display Network Ad Planner ranking provided by Google, Inc. The domain names that matches with the list of domain names are identified as the unique domain names and returned to the security server.

In a next step 205, a security server may execute one or more scoring algorithms to determine which, if any, of the unique domain names for websites or host servers that are likely threatening, malicious, or otherwise undesirable to be exposed to the enterprise network. For example, the security server may determine a credibility score for each respective unique domain name based upon a comparison with a domain name corpus stored in a dictionary database where the domain name corpus includes a plurality of words.

The security server may accesses the dictionary database, and matches a first letter in the input domain name, and then finding the descendant nodes from that root that match the successive letters of the input domain name. In another embodiment, the security server may identify the first few characters of the input domain name, and then finding the descendant nodes from that root that match the successive letters of the input domain name. For example, after the security server accesses the dictionary database containing the dictionary of words, it may generate a search tree of words for possible domain names. The security server then proceeds to search through the search tree one at a time based on an inputted domain name. The security server selects the first character of the domain, and matches into a search tree to determine if the first character of the domain has a match, and if the first character of the domain does a match, the security server goes down to the next peer of the search tree, and determines if the next two characters in that branch of the tree match.

The security server may further determine a credibility score for the input unique domain name by identifying a number of matches to the plurality of words in the domain name corpus. In one embodiment, the security server may determine a credibility score for the input unique domain name based on the number of matches to the plurality of words in the domain name corpus. In another embodiment, the security server may determine a credibility score for the input unique domain name based on an amount of numeric characters in the domain name. In yet another embodiment, the security server may further determine a credibility score for the input unique domain name based on a length of the domain name.

The dictionary database may include a whitelist record and a blacklist record. The whitelist record may include a list of authorized and acceptable domain names and IP addresses. The set of one or more acceptable and authorized domain names of the whitelist record are predetermined to satisfy the acceptability threshold required by the inputted domain names. During operation, in order to identify the unique domain names from the list of domain names, the security server may first query a whitelist record and/or a blacklist record in the dictionary database. The security server upon determining that the inputted domain name is present in the whitelist record and/or the blacklist record, the security server may automatically forge determination of the creditability score of each unique domain name that is matched to an acceptable domain name in the whitelist record and/or the blacklist record.

The security server may generate and/or update whitelist records and blacklist records based on classification of an incoming query. The query is classified based on an IP address and domain. The classification of the query based on the IP address and the domain can be done in numerous ways. For example, an IP address and domain pair associated with known friends of registered user can be whitelisted. The query can be classified by consulting a record of previous classifications made to queries with the same IP address and domain. For example, if a user receives messages from a company with domain anycompany.com and the company only sends messages from a particular set of good IP addresses, then over time, the good IP addresses become associated with anycompany.com. It is difficult for a spammer to send a spam message with a forged sender domain of "company.com" which also forges the boundary IP address. Therefore, if company.com is whitelisted, it is very likely that queries purporting to be from company.com originating from the IP addresses that have become associated with company.com should enjoy automatic acceptance as a result of the whitelist record. The queries from a user with a sender domain of "company.com" and any other IP address can be treated differently than messages from IP addresses that over time have become associated with company.com. They may be classified as suspicious and put into a blacklist record.

In some embodiments, during operation, in order to identify the unique domain names from the list of domain names, the security server may query a blacklist record in the dictionary database. The blacklist record may include a list of domain names and Internet Protocol (IP) addresses of computing devices that may include malware. In one example, the blacklist record may include a list of domain names and IP addresses that are linked to spamming. The list of Internet protocol (IP) addresses published in the blacklist record that should be avoided may be published in a format that may be queried by a security server computer program. The security server upon determining that the inputted domain name is present in the blacklist record as an output of the query to the blacklist record, the security server is configured to reject or flag the inputted domain name. Furthermore, the security server upon determining that the inputted domain name is present in the blacklist record, the security server may automatically forge determination of the creditability score of the unique domain names that are matched to blocked domain names in the blacklist record.

At step 207, a security server may be configured to automatically update the case management database with the unique domain names that are matched to blocked domain names in the blacklist record. In some embodiments, the security server upon determining that the unique domain name does not match with domain names in the whitelist record and/or blacklist record, but the credibility score for the unique domain name fails an acceptability threshold, the security server updates the case management database with the data associated to the unique domain name that fails the acceptability threshold score.

In a next step 209, a security server upon determining that the credibility score for the unique domain name fails an acceptability threshold, the security server generates an alert. The security server then transmits the alert to one or more administrator devices that identifies the malicious, harmful, or otherwise unscrupulous unique domain name that failed an acceptability threshold. In some embodiments, the security server upon determining that the inputted domain name is present in the blacklist record, the security server generates an alert. The security server then transmits the alert to one or more administrator devices identifying the malicious, harmful, or otherwise unscrupulous unique domain name that was present in the blacklist record.

In a next step 211, a security server may update a whitelist record in a dictionary to include data associated to the unique domain name in response to receiving an instruction from an administrator device. The instruction may indicate that the unique domain name is acceptable domain name. The security server may further update a blacklist record in a dictionary in response to receiving a block instruction from an administrator device. The instruction may include details associated to a new blocked domain name containing the one or more characteristics associated with the unique domain name. Upon receiving the block instruction, the security server updates the blacklist record by including into the blacklist record the new blocked domain name.

The security server upon determining that the credibility score for a unique domain name in the one or more unique domain names fails an acceptability threshold, the security server puts the unique domain name that failed an acceptability threshold into the blacklist record and the blacklist record is updated.

Figure 3:
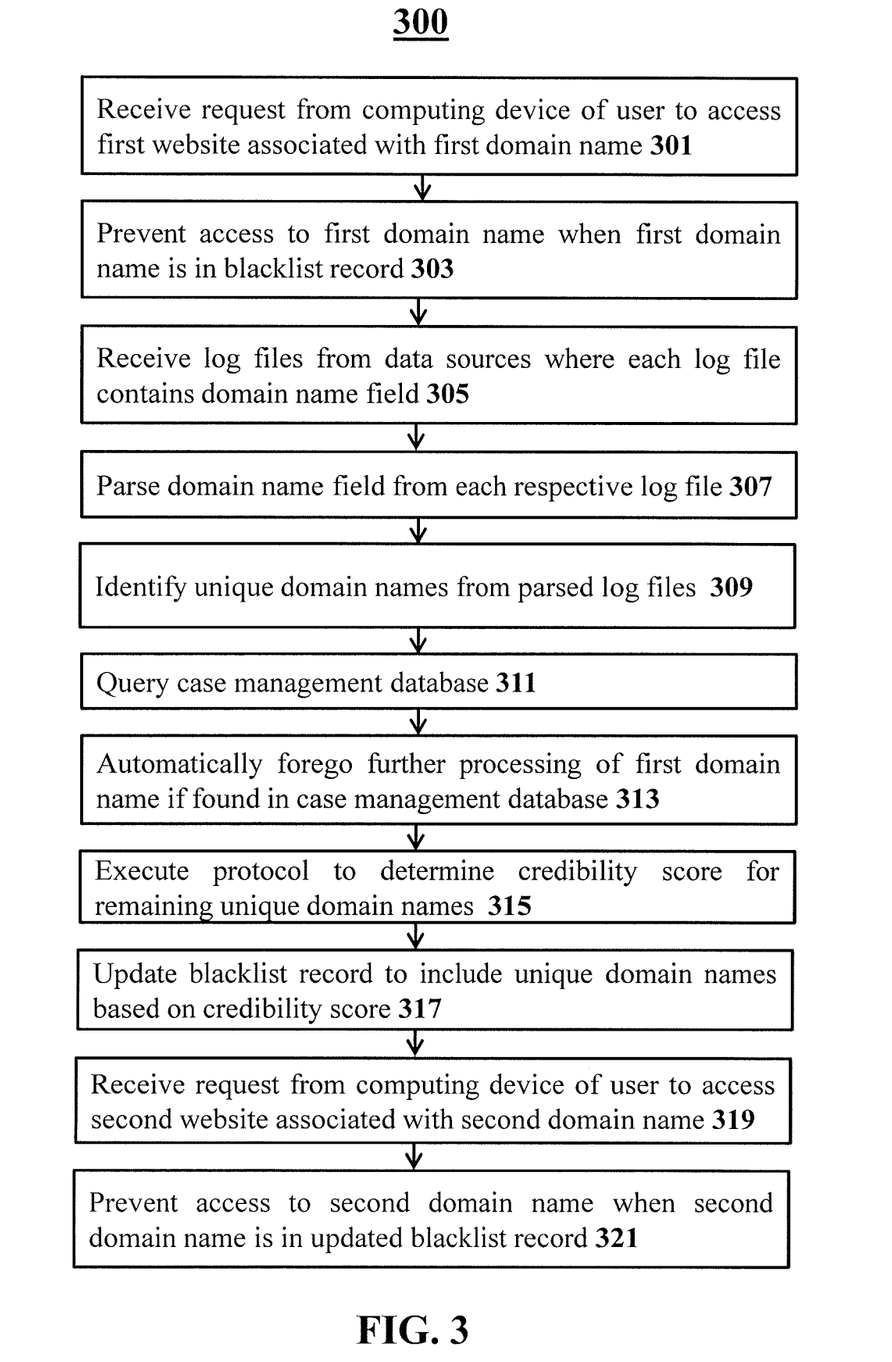
FIG. 3 shows execution of a method for identifying and tracking malicious, harmful, or otherwise unscrupulous domain names, according to an embodiment.

FIG. 3 shows execution of an automated method 300 for identifying and tracking malicious, harmful, or otherwise unscrupulous domain names. The method 300 shown in FIG. 3 includes execution steps 301, 303, 305, 307, 309, 311, 313, 315, 317, 319, and 321. However, other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server. However, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 301, a server may receive a request from a computing device of a user to access a first website associated with a first domain name. The user may operate the computing device such as a laptop computer, and the laptop computer and the server may be part of a same enterprise network.

In some embodiments, a server may receive multiple requests from multiple computing devices of users to access various websites associated with various domain names. For example, a third user operating a third computer may transmit a request to a server to access a third website associated with a third domain name, and similarly a fourth user operating a fourth computer may transmit a request to a server to access a fourth website associated with a fourth domain name. In some embodiments, the server may receive multiple requests from a single computing device of a user to access various websites associated with various domain names. For example, a third user operating a third computer may transmit a request to a server to access a third website associated with a third domain name as well as a fourth website associated with a fourth domain name.

In a next step 303, a server upon receiving a request from a computing device of a user may then process information associated with the request. The request may include a first domain name and a bid to access a first website associated with the first domain name. During the processing of the request, the server may initially query a case management database. The case management database may include a blacklist record and a whitelist record. The blacklist record may include a set of one or more blocked domain names. The whitelist record may include a set of one or more acceptable domain names. The server upon determining that the first domain name is in the blacklist record may then prevent the computing device to connect to and/or access the first domain name. And similarly, the server upon determining that the first domain name is in the whitelist record may then allow the computing device to connect to and/or access the first domain name.

In a next step 305, a server may receive a plurality of log files from a plurality of data sources. The plurality of data sources may generate and store the plurality of the log files after every predetermined period of time, which may be one hour, one day, or one week. Each of the plurality of log files may contain a domain name field associated with one of a plurality of domain names. The plurality of domain names may include a name of a first domain name, a second domain name, a third domain name, a fourth domain name, among others. In some embodiments, the plurality of domain names may include names of all domain name requests received from various computing devices of various users in an enterprise network. In some embodiments, the plurality of domain names may include names of all domain names that may have mentioned at some electronic device within the enterprise network. For example, a fifth domain name and a sixth domain name may have been mentioned in an electronic file stored on a first electronic device, and a data source may scrape the electronic file to identify the fifth domain name and the sixth domain name, which may then be included in a log file.

The data sources may include network appliances. The network appliances may be computing devices capable of generating and/or storing network logs, sometimes referred to as "log files." The logs may be stored in any machine-readable format (e.g., TXT, XML, HTML, Access Log, Common Log, W3C Log, WAS Log), and may include various data fields containing data at various OSI layers from inbound IP packets (e.g., source IP address, source Domain Name, source MAC address, source device identifier). In some implementations, the logs may be stored locally in the particular network appliance or device that generated the logs, such as proxy servers, routers, firewalls, and security software applications configured to manage and track enterprise security risks. In some implementations, the logs may be stored into an enterprise security database that is accessible to the security server locally (on the same device) or via a network.

In a next step 307, a server may parse the domain name field from each respective log file. An expression matching technique may be used to parse the domain name field from each respective log file. Then in a next step 309, a server may identify one or more unique domain names in a plurality of domain name fields parsed from the plurality of log files. The one or more unique domain names may include non-identical domain names. For example, during execution of parsing process, the server may query various data fields of the log files containing a source domain name to identify the logs containing duplicative domain names. The server may then discard or otherwise disregard log files containing domain names that are duplicative, and thereby generating a set of log records containing only unique domain names.

In a next step 311, a server may query a whitelist record and a blacklist record stored in a case management database. The server may query the whitelist record and the blacklist record to determine if there is a presence of any record of any of the one or more unique domain names. The one or more unique domain names may include a first domain name among other domain names that may have been mentioned in an enterprise network.

In a next step 313, a server upon determining that the first domain name is in the blacklist record, the server may then automatically forego further processing and analysis associated with the first domain name. The server will forego further processing and analysis associated with the first domain name since the first domain name is already blocked, and no electronic device within the enterprise network will be able to access the first domain name or would have been allowed to access the first domain name.

In a next step 315, a server may execute a protocol to determine a credibility score for each of remaining one or more unique domain names. The protocol may correspond to a scoring program. In some embodiments, the protocol may correspond to a scoring algorithm. The server may use the scoring algorithm to calculate the credibility score for each of remaining one or more unique domain names based at least upon a length of the each of the remaining one or more unique domain names. For example, the scoring algorithm may assign a score to each unique domain name based on total number of characters within the unique domain name. In some cases, a high score may be assigned to an unique domain name, which has a large number of characters and a low score may be assigned to an unique domain name, which has a less number of characters. In some cases, a high score may be assigned to an unique domain name, which has a less number of characters and a low score may be assigned to an unique domain name, which has a large number of characters. In some embodiments, the server may use the scoring algorithm to calculate the credibility score for each of remaining one or more unique domain names based at least upon a comparison of each of the remaining one or more unique domain names with a domain name corpus stored in a dictionary database. The domain name corpus may include a plurality of words. For example, when a complete unique domain name is found in the present the dictionary database, accordingly a credibility score may be assigned to the unique domain name. Likewise, when a portion of an unique domain name is found in the dictionary database, accordingly a credibility score may be assigned to the unique domain name. In some embodiments, the server may use the scoring algorithm to calculate the credibility score for each of remaining one or more unique domain names based at least upon a length of the each of the remaining one or more unique domain names and a comparison of each of the remaining one or more unique domain names with a domain name corpus stored in a dictionary database.

In a next step 317, a server upon determining that the credibility score for various domain names in the one or more remaining unique domain names fails an acceptability threshold, then the server may update the blacklist record to include said various domain names. For instance, when the server determines that the credibility score for a second domain name in the one or more remaining unique domain names fails an acceptability threshold, the server may then update the blacklist record to include the second domain name. Similarly, the server upon determining that the credibility score for various domain names in the one or more remaining unique domain names is over an acceptability threshold, then the server may review said various domain names and update the whitelist record to include said various domain names.

In a next step 319, a server may receive a new request from the computing device of the user to access a second website associated with the second domain name. The server upon receiving the new request from the computing device of the user may then process information associated with the new request. The new request may include a second domain name and a bid to access a second website associated with the second domain name. During the processing of the new request, the server may initially query a case management database. The case management database may include an updated blacklist record and an updated whitelist record. The updated blacklist record may include a set of one or more blocked domain names. The updated whitelist record may include a set of one or more acceptable domain names. In a next step 321, a server upon determining that the second domain name is in the updated blacklist record may then prevent the computing device to connect to and/or access the second domain name.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A server-implemented method comprising:
   receiving, by a server, a plurality of log files from a plurality of data sources configured to generate and store the plurality of log files, wherein each of the plurality of log files contains a domain name field associated with one of a plurality of domain names;
   parsing, by the server, the domain name field from data fields of each log file within the plurality of log files, wherein the data fields comprise information associated with a source or destination of data populated within a data record, the parsing including:
      comparing, by the server, domain names parsed from the plurality of log files to each other based on matching identical consecutive characters;
      identifying, by the server, non-identical yet equivalent domain names that each include an identical consecutive character pattern based on the comparison; and
      in response to identifying at least two non-identical domain names parsed from the data fields of the plurality of log files that include the identical consecutive character pattern,
         replace at least one of the at least two non-identical domain names in the domain names with a replacement unique domain name, wherein the replacement unique domain name is different than at least one of the at least two non-identical yet equivalent domain names;

returning the replacement unique domain name that replaced the at least one of the at least two non-identical yet equivalent domain names;

in response to receiving the returned replacement unique domain name, comparing the domain names, including the returned replacement unique domain names, parsed from the plurality of log files to each other to identify, by the server, a set of one or more unique domain names and eliminating duplicative domain names, wherein the duplicative domain names include at least one of the returned replacement unique domain names;

disregarding at least one of the plurality of log files associated with the duplicative domain name;

executing, by the server, a protocol to determine a credibility score for two or more of the one or more unique domain names based at least upon a length of each of the two or more unique domain names and a comparison of each of the two or more unique domain names with a domain name corpus stored in a dictionary database, the domain name corpus comprising a plurality of words; and in response to determining that the credibility score for a first domain name in the two or more unique domain names fails an acceptability threshold, updating, by the server, a blacklist record to include the first domain name, the blacklist record comprising a set of one or more blocked domain names.

2. The server-implemented method according to claim 1, wherein identifying the one or more unique domain names further comprises:

querying, by the server, a whitelist record comprising a set of one or more acceptable domain names, wherein the server automatically forgoes determining the credibility score of at least one of the one or more unique domain names matched to an acceptable domain name in the whitelist record.

3. The server-implemented method according to claim 1, further comprising:

updating, by the server, a whitelist record to include a unique domain name from the one or more unique domain names in response to receiving an instruction indicating the unique domain name is acceptable from an administrator device, the whitelist record comprising a set of one or more acceptable domain names.

4. The server-implemented method according to claim 1, wherein identifying the one or more unique domain names further comprises:

querying, by the server, the blacklist record, the blacklist record further comprising the set of one or more blocked domain names predetermined to fail the acceptability threshold, wherein the server automatically forgoes determining the credibility score of at least one of the one or more unique domain names matched to a blocked domain name in the blacklist record;

automatically updating, by the server, a case management database with the one or more unique domain names identified in the blacklist record; and automatically transmitting an alert for the one or more unique domain names in the blacklist record.

5. The server-implemented method according to claim 4, further comprising:

updating, by the server, the case management database to include one or more characteristics associated with the one or more unique domain names identified in the blacklist record, wherein the blacklist record is configured to store one or more characteristics of each respective blocked domain name in the blacklist record.

6. The server-implemented method according to claim 5, further comprising:

storing, by the server, into the blacklist record a new blocked domain name comprising the one or more characteristics associated with the one or more unique domain names in response to receiving a block instruction from an administrator device.

7. The server-implemented method according to claim 1, wherein determining the credibility score for two or more of the one or more unique domain names further comprises:

identifying, by the server, a number of matches to the plurality of words in the domain name corpus, wherein the credibility score is further based on the number of matches to the plurality of words in the domain name corpus.

8. The server-implemented method according to claim 1, wherein the credibility score for each of the two or more unique domain names is based on an amount of numeric characters in each of the two or more unique domain names.

9. The server-implemented method according to claim 1, wherein the credibility score for each of the two or more unique domain names is based on a length of numeric characters in each of the two or more unique domain names.

10. The server-implemented method according to claim 1, wherein a data source in the plurality of data sources is selected from the group consisting of a proxy server, a domain name server, a router, a firewall, and a security server.

11. A system comprising:

a dictionary database comprising a domain name corpus, the domain name corpus comprising a plurality of words;

a case management database storing a blacklist record comprising a set of one or more blocked domain names and a whitelist record comprising a set of one or more acceptable domain names; and a server configured to:

receive a plurality of log files from a plurality of data sources configured to generate and store the plurality of log files, wherein each of the plurality of log files contains a domain name field associated with one of a plurality of domain names;

parse the domain name field from data fields of each log file within the plurality of log files, wherein the data fields comprise information associated with a source or destination of data populated within a data record, the parsing including:

compare, by the server, domain names parsed from the plurality of log files to each other based on matching identical consecutive characters;

identify, by the server, non-identical yet equivalent domain names that each include an identical consecutive character pattern based on the comparison; and in response to identifying at least two non-identical domain names parsed from the data fields of the plurality of log files that include the identical consecutive character pattern, replace at least one of the at least two non-identical domain names in the domain names with a replacement unique domain name, wherein the replacement unique domain name is different than at least one of the at least two non-identical yet equivalent domain names;

return the replacement unique domain name that replaced the at least one of the at least two non-identical yet equivalent domain names;

in response to receiving the returned replacement unique domain name, compare the domain names, including the returned replacement unique domain names, parsed from the plurality of log files to each other to identify a set of one or more unique domain names and eliminate duplicative domain names, wherein the duplicative domain names include at least one of the returned replacement unique domain names;

disregard at least one of the plurality of log files associated with the duplicative domain name;

determine a credibility score for two or more of the one or more unique domain names based at least upon a length of each of the two or more unique domain names and a comparison of each of the two or more unique domain names with the domain name corpus; and in response to determining that the credibility score for a first domain name in the two or more unique domain names fails an acceptability threshold, update the blacklist record to include the first domain name.

12. The system according to claim 11, wherein in order to identify the one or more unique domain names, the server is further configured to:

query the whitelist record, wherein the server automatically forgoes determining the credibility score of at least one of the one or more unique domain names matched to an acceptable domain name in the whitelist record.

13. The system according to claim 11, wherein the server is further configured to update the whitelist record to include a unique domain name from the one or more unique domain names in response to receiving an instruction indicating the unique domain name is acceptable from an administrator device.

14. The system according to claim 11, wherein in order to identify the one or more unique domain names, the server is further configured to:

query the blacklist record, wherein the server automatically forgoes determining the credibility score of at least one of the one or more unique domain names matched to a blocked domain name in the blacklist record, automatically update the case management database with the one or more unique domain names that are identified in the blacklist record; and automatically transmit an alert for the one or more unique domain names in the blacklist record.

15. The system according to claim 14, wherein the server is further configured to update the case management database to include one or more characteristics associated with the one or more unique domain names identified in the blacklist record, wherein the blacklist record is configured to store one or more characteristics of each respective blocked domain name in the blacklist record.

16. The system according to claim 15, wherein the server is further configured to store into the blacklist record a new blocked domain name comprising the one or more characteristics associated with the one or more unique domain names in response to receiving a block instruction from an administrator device.

17. The system according to claim 11, wherein determining the credibility score for each of the two or more unique domain names further comprises the server identifying a number of matches to the plurality of words in the domain name corpus, wherein the credibility score for each of the two or more unique domain names is further based on the number of matches to the plurality of words in the domain name corpus.

18. The system according to claim 11, wherein the credibility score for each of the two or more unique domain names is based on an amount of numeric characters in each of the two or more unique domain names.

19. The system according to claim 11, wherein the credibility score for each of the two or more unique domain names is based on a length of numeric characters in each of the two or more unique domain names.

20. The system according to claim 11, wherein a data source in the plurality of data sources is selected from the group consisting of a proxy server, a domain name server, a router, a firewall, and a security server.

* * * * *